(12) United States Patent
Malheurty et al.

(10) Patent No.: US 10,522,269 B1
(45) Date of Patent: *Dec. 31, 2019

(54) CABLE SHEATH CONTAINING A POLYMER BLEND OF POLYVINYLBUTYRAL AND THERMOPLASTIC POLYURETHANE

(71) Applicant: NEXANS, Courbevoie (FR)

(72) Inventors: Laureene Malheurty, Lyons (FR); Didier Billemaz, Nievroz (FR)

(73) Assignee: NEXANS, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,303

(22) Filed: Aug. 10, 2018

Related U.S. Application Data

(63) Continuation-in-part of application No. 15/675,120, filed on Aug. 11, 2017, now Pat. No. 10,214,645.

(51) Int. Cl.
| | |
|---|---|
| *H01B 3/00* | (2006.01) |
| *H01B 7/18* | (2006.01) |
| *C08L 75/06* | (2006.01) |
| *C08L 75/08* | (2006.01) |
| *C08L 29/14* | (2006.01) |
| *C08K 5/521* | (2006.01) |
| *C08K 5/00* | (2006.01) |
| *C08K 3/016* | (2018.01) |
| *C08K 5/12* | (2006.01) |
| *C08K 5/435* | (2006.01) |

(52) U.S. Cl.
CPC .............. *H01B 7/18* (2013.01); *C08L 29/14* (2013.01); *C08L 75/06* (2013.01); *C08L 75/08* (2013.01); *C08K 3/016* (2018.01); *C08K 5/0066* (2013.01); *C08K 5/12* (2013.01); *C08K 5/435* (2013.01); *C08K 5/521* (2013.01); *C08L 2203/20* (2013.01)

(58) Field of Classification Search
CPC ........................................................ H01B 3/00
USPC ........................................ 174/110 R, 110 SR
See application file for complete search history.

(56) References Cited

U.S. PATENT DOCUMENTS

| | | | |
|---|---|---|---|
| 4,000,362 | A | 12/1976 | Kawaguchi et al. |
| 5,462,911 | A | 10/1995 | Takao et al. |
| 10,214,645 | B1 * | 2/2019 | Malheurty .............. C08L 75/06 |
| 2006/0231189 | A1 | 10/2006 | Ma et al. |
| 2010/0044070 | A1 | 2/2010 | Schmidt |
| 2013/0059943 | A1 | 3/2013 | Yan et al. |
| 2013/0081853 | A1 | 4/2013 | Mundra et al. |
| 2013/0330468 | A1 * | 12/2013 | Makadia .................. C08K 5/52 |
| | | | 427/117 |
| 2017/0121502 | A1 | 5/2017 | Ni et al. |
| 2017/0260355 | A1 | 9/2017 | Makadia |

OTHER PUBLICATIONS

European Search Report dated Dec. 21, 2018.
Chile Office Action dated Aug. 10, 2018.

* cited by examiner

*Primary Examiner* — Chau N Nguyen
(74) *Attorney, Agent, or Firm* — Sofer & Haroun, LLP

(57) ABSTRACT

A cable having one or more conductors and a jacket is provided, where the jacket is made from a composition including a polymer blend of thermoplastic polyurethane (TPU), and Polyvinylbutyral (PVB), with the ratio of PVB to TPU being less than 50% PVB by weight of the total weight of the polymer blend, the remainder of the polymer blend being TPU.

17 Claims, 4 Drawing Sheets

CABLE SHEATH CONTAINING A POLYMER BLEND OF POLYVINYLBUTYRAL AND THERMOPLASTIC POLYURETHANE

RELATED APPLICATION

This application is a continuation-in-part of U.S. patent application Ser. No. 15/675,120, filed on Aug. 11, 2017, the entirety of which is incorporated by reference.

FIELD OF THE INVENTION

This invention relates to a polymer blend for use as a cable jacket. More particularly this invention relates to a polymer blend for use in an abrasion and fire resistant cable jacket for heavy industry cables, such as mining cables, automation cables and the like.

DESCRIPTION OF RELATED ART

Heavy equipment cables, such as mining cables or other industrial work site cables are subject to very rugged environmental conditions and operating parameters that include dragging and moving against rough surfaces. Such environmental stresses and abrasion can lead to failure of the primary outer insulation jacket.

Because of these conditions, mining cables, as one example, need to meet stringent safety standards. The Insulated Cable Engineers Association (ICEA) sets a standard that includes several mechanical thresholds for cable jackets ICEA S75-381. See Table 1 below.

TABLE 1

ICEA S-75-381
Table 3-3
EXTRA-HEAVY-DUTY CROSSLINKED JACKETS AND THERMOPLASTIC POLYURETHANE

|  | Chlorinated Polyethylene | Neoprene | Nitrile butadiene/ Polyvinyl-chloride | Chlorosulfonated Polyethylene* | Thermoplastic Polyurethane |
|---|---|---|---|---|---|
| PHYSICAL REQUIREMENTS | | | | | |
| Tensile Strength, min., psi | 2,400 | 2,400 | 2,400 | 2,400 | 3,700 |
| Tensile stress at 200 percent elongation, min., psi | 700 | 700 | 700 | 700 | 800 |
| Elongation at rupture, min., percent | 300 | 300 | 300 | 300 | 400 |
| Set, Max., percent | 30 | 20 | 30 | 30 | N/A |
| Tear resistance, min., ppi | 40 | 40 | 40 | 40 | 80 |
| AGING REQUIREMENTS | | | | | |
| After air oven test at 100° C. ± 1° C. for 168 hours Tensile Strength, min., percentage of unaged value | 70 | 50 | 50 | 70 | 50 |
| Elongation at rupture, min., percentage of unaged value | 55 | 50 | 50 | 60 | 75 |
| After oil immersion test at 121° C. ± 1° C. for 18 hours Tensile strength and elongation, min., percentage of unaged value | 60 | 60 | 60 | 60 | 60 |
| ELECTRICAL REQUIREMENTS | | | | | |
| Surface resistance, nonshielded cables min., megohms | 100 | 100 | 100 | 100 | N/A |

*Also known as Chlorosulfonyl Polyethylene

Also, the MSHA (Mine Safety and Health Administration) sets forth the relevant fire safety standards in 30 CFR §§ 7.402 (definitions), 7.406 (test equipment) and 7.408 (test procedure and results requirements to pass).

In the prior art, the industry typically makes the jacket for these mining cables from thermoplastic polyurethane (TPU), chlorinated polyethylene (CPE), or polychloroprene rubber (CR). Compared with the later two, TPU based polymers have very good abrasion and tear resistance while meeting the required fire resistance standards. However, TPU polymer is quite expensive. Also, the other two polymers CPE and CR are halogenated and thus produce toxic smoke.

Also, elastomer solutions like CPE or CR have the additional disadvantage that they have to be crosslinked after extrusion, which results in additional working steps to finish the cable. This results in additional production costs and time in comparison to thermoplastics like TPU.

The following Table 2 shows Abrasion Index per ISO 4649 comparison between some standard solutions such as CPE or chlorosulfonated polyethylene (Hypalon®) against basic natural rubber and TPU.

TABLE 2

| | ICEA Minimum for EDH Jackets | Chlorinated Polyethylene (CPE) | Chlorosulfonated Polyethylene (Hypalon ®) | Thermoplastic Polyurethane (TPU) | Natural Rubber |
|---|---|---|---|---|---|
| Abrasion Index per ISO 4649 | No requirement | 70 | 74 | 15 | 56 |

It is noted that the "Abrasion Index" in the above table is not an ICEA standards requirement, but in any case it is an indication of the abrasion resistance of a jacket compound. It is a number measured per the standard ISO 4649 (International Organization for Standards), with lower numbers indicating higher resistance to abrasion. In severe mining applications an abraded jacket can lead to cable failure. Although abrasion is not an ICEA standards requirement, it is a useful element to consider when choosing a jacket material.

OBJECTS AND SUMMARY

The objective of the invention is to provide a TPU-based polymer blend which can be used to form the jacket of a heavy equipment cable, such as a mining cable, industry automation cable or the like. The present arrangement, and the various formulations herein, are able to manage the fire resistance issues required by mining cable tests such as 30 CFR 7.408 and other fire tests used in heavy industry cables; maintain the required mechanical strength; all while achieving the desired cost cutting by limiting the amount of TPU used.

An object of the present invention is thus a cable, said cable comprising:
 one or more conductors; and
 a jacket,
 wherein said jacket is made from a composition including a polymer blend of thermoplastic polyurethane (TPU) and Polyvinylbutyral (PVB), with the ratio of PVB to TPU being less than 50% PVB by weight, and preferably being less than or equal to 49% PVB by weight, of the total weight of the polymer blend, the remainder of the polymer blend being TPU.

In other words, the polymer blend comprises less than 50% by weight of PVB, and more particularly less than or equal to 49% by weight of PVB, over the total weight of the polymer blend of PVB and TPU.

Thanks to the combination of TPU with PVB, an economic cable and/or jacket having good mechanical strength and abrasion resistance is obtained.

In one embodiment, the amount of PVB to TPU ranges from 1 to 45% by weight, and preferably from 10 to 40% by weight; and the amount of TPU ranges from 55 to 99% by weight, and preferably from 60 to 90% by weight, over the total weight of the polymer blend of PVB and TPU.

More particularly, the ratio of PVB to TPU is substantially 25% PVB to 75% TPU by weight, over the total weight of the polymer blend.

Thermoplastic polyurethanes (TPU) belong to the family of thermoplastic elastomers (TPE) and are more precisely block copolymers. It has the same level of elasticity of crosslinked polymers (rubbers) while offering in the same time the same easy process as thermoplastics. A thermoplastic urethane (TPU) according to the invention results preferably from the association on the same molecule of flexible segments (chain extenders), with a high extensibility and low glass transition temperature, with rigid crystallizing segments, with a high melting point, that gives the elastomeric feature. The ratio and molecular structure of these segments can determine the specific features of the resin.

A thermoplastic polyurethane (TPU) according to the invention is generally obtained by reaction of a polyol with a polyisocyanate. These ones have to contain at least two functional groups per molecule respectively hydroxyl groups R—(OH)$_n$ and isocyanate group R—(N=C=O)$_n$. The reaction is preferably driven in the presence of a catalyst or by activation with ultraviolet light.

The polyisocyanate may be aromatic or aliphatic and the most commonly used is bi-functional. Aromatic examples of a polyisocyanate are diphenylmethane diisocyanate (MDI) or toluene diisocyanate (TDI). The aliphatic ones include hexamethylene diisocyanate (HDI) or isophorone diisocyanate (IPDI).

The polyol may be either a polyether polyol which is made by the reaction of an epoxide with an active hydrogen containing compound, or a polyester polyol which is made by the polycondensation of a multifunctional carboxylic acid and a polyhydroxyl compound. Higher molecular weight polyols (molecular weights from 2,000 to 10,000) are preferably used to make more flexible polyurethanes, while lower molecular weight polyols make more rigid products. Polyether and polyester polyols give respectively by reaction with polyisocyanates polyether polyurethanes and polyester polyurethanes. Examples of polyols can be glycol, diethylene glycol or triethyleneglycol.

The commonly used catalysts can include tertiary amines such as triethylene diamine (TEDA or also called DABCO for 1,4-diazabicyclo[2.2.2]octane), and metallic compounds, such as dibutyltin dilaurate (DBTDL) or bismuth octanoate.

The main producers of TPU can be BASF with Elastollan® range and Lubrizol with Estane® range.

In one embodiment, the TPU of the polymer blend is selected from a thermoplastic polyether polyurethane and a thermoplastic polyester polyurethane.

Considering characteristics of each type of TPU, the preferred embodiment is the use of polyether polyurethane.

PVB is a polyacetal, which can be produced by the condensation of polyvinyl alcohol with n-butyraldehyde, in particular in the presence of an acid catalyst. The condensation reaction can produce 1,3-dioxane rings but some unreacted hydroxyl groups may be still present onto the polymer at the end of the reaction. A limited amount of acetate groups can also be present because of production of polyvinyl alcohol from the hydrolysis of polyvinyl acetate.

The final structure of the PVB can be considered to be a random ter-polymer of vinyl butyral, vinyl alcohol and vinyl acetate as co-monomers, and thus having different amounts of said co-monomers. The amounts of said co-monomers are typically respectively 60-90%, 10-30% and 0-10%, and, in the preferred embodiment, 77-83%, 18-23%, 0-2%.

In one embodiment, PVB is recycled PVB.

In the case of recycled PVB, it is available in large quantities with a good quality level and very low rate of impurities. The use of recycled PVB in some embodiments may offer additional environmental and economic advantages in addition to better flexibility. Recycled PVB price is much more favorable than common TPU grades on market. Moreover using post-consumer PVB is green compliant with eco-design approach and enables a lower carbon footprint.

Several producers propose various grades of recycled PVB on the market, so variations in chemical composition (e.g. proportions of vinyl butyral, vinyl alcohol and/or vinyl acetate) can occur and the resulting recycled products could vary in composition and properties depending on the original source.

The composition can further comprise a plasticizer, and more particularly a PVB plasticizer.

When PVB is plasticized, different plasticizers could be present to different extents.

In particular, PVB is an amorphous polymer, and its glass transition temperature can vary with plasticizer amount.

The PVB plasticizer can be selected from the group consisting of aliphatic esters, aromatic esters, fatty esters, phosphate esters, sulfonamides, phthalates, and mixtures thereof.

More particularly, the PVB plasticizer can be selected from the group consisting of, branched ethylene glycol ester between 20 and 30%, hexanoate such as triethylenglycol-di-2-ethylhexanoate, adipate such as dihexyladipate, phosphate such as tricresylphosphate, phthalate such as butyl phenyl phthalate, sulfonamide such as n-ethyltoluene sulfonamide, triethylenglycol-di-2-ethylbutyrate, tetraethylenglycol-di-heptanoatedihexyladipat, dibutylsebacate, and mixture thereof.

The triethylenglycol-di-2-ethylhexanoate can be provided by EASTMAN, and is commonly known under the brand name TEG-EH.

The dihexyladipate is commonly known under the brand name SANTICIZER 367.

The tricresylphosphate is commonly known under the brand name Disflamoll TKP, and can be provided by LANXESS.

The butyl phenyl phthalate is commonly known under the brand name SANTICIZER 160.

The n-ethyltoluene sulfonamide is commonly known under the brand name, KETJENFLEX 9S.

The composition can comprise from 10 to 50 parts by weight of plasticizer, and more preferably from 30 to 40 parts by weight of plasticizer, per 100 parts by weight of the PVB.

The composition can further comprise one or more fire retardants.

In one embodiment, the fire retardants (or fire retardant additives) are those that may act as diluents in gas phase or condensed phase, and/or as antidripping agents, or as smoke suppressants, and/or that can promote char formation.

The composition can comprise from 5 to 60 parts by weight of fire retardants, and more preferably from 10 to 40 parts by weight of fire retardants, per 100 parts by weight of the polymer blend.

The fire retardants can be selected from the group consisting of inorganic flame retardants, organic flame retardants and mixtures of inorganic and organic flame retardants.

The organic flame retardants are preferably selected from nitrogen components, halogenated flame retardants, phenol formaldehyde resins, phosphorous containing flame retardants, and mixtures thereof.

The inorganic flame retardants are more particularly selected from the group consisting of:
  metal hydroxides such as aluminium trihydroxide (ATH), magnesium dihydroxide (MDH) (milled, ground or precipitated), in particular without or with surface treatment, for example to improve filler dispersion mechanical properties and so on;
  silicates such as talc or nanoclay (e.g. magnesium aluminium silicate),
  silica,
  phyllosilicates such as montmorillonite, kaolinite, mica;
  carbonates such as calcium carbonate, magnesium carbonate;
  microgranulated nanoclay such as montmorillonite, bis(hydrogenated tallow alkyl)dimethyl salt with bentonite such as Cloisite 20 (from BYK additives);
  metal oxides such as magnesium oxide, zinc oxide, antimony oxide, iron oxide for example mainly in synergy with ATH or MDH;
  aluminium oxide hydroxide ($\gamma$-AlO(OH)) mineral or boehmite (antidripping action);
  tin components such as zinc stannate (Flamtard from William Blythe or sureflam ZS from Wallace FR), zinc hydroxystannate (flamtard or sureflam ZHS from Wallace FR);
  expandable graphite, in particular as intumescent system;
  molybdate compounds such as zinc molybdate, in particular as smoke suppressant, and more preferred zinc molybdate precipitated on an inorganic core such as zinc borate or magnesium hydroxide (Kemgard products from Huber);
  boron containing compounds such as zinc borate: for example, boron containing compounds act by stepwise release of water and formation of a glassy coating which protects the surface,
  phosphorous containing flame retardants, and
  mixtures thereof.

Boron containing compounds such as zinc borate, silicates such as nanoclay, and metal hydroxide such as ATH, are preferred.

Nitrogen components are more particularly selected from:
  nitrogen based flame retardants such as melamine cyanurate (melapur MC), melamine phosphate (melapur MP), melamine polyphosphate (melapur 200), or mixture thereof; and
  melamine homologues such as melam, melem, or melon.

Melamine cyanurate is preferred.

Halogenated flame retardants are more particularly selected from the group consisting of:
  halogenated components such as brominated components, chlorinated paraffin; and
  PTFE (antidripping), for example in intumescent system mainly with (di)pentaerythritol.

Phenol formaldehyde resins (PF) or phenolic resins are more particularly selected from epoxy novolak resin (for antidripping).

Phosphorous containing flame retardants can be organic or inorganic compounds such as organophosphorous, red phosphorous, phosphoric acid derivatives, oligomeric phosphate esters, phosphate derivatives but not limited. The most important phosphorus-containing flame retardants are phosphate esters, phosphonates, and phosphinates such as metal phosphinates.

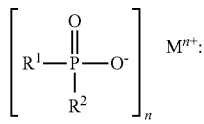

general structure of metal phosphinate.

A preferred example of metal phosphinate is aluminium diethyl phosphinate (also called DEPAL).

Examples of phosphate esters are:

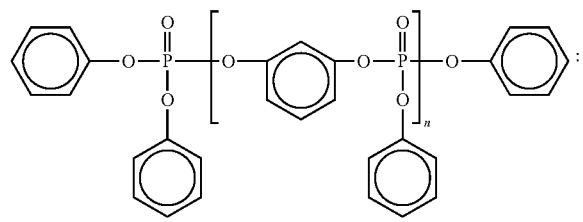

n = 1-7 resorcinol bis (diphenyl phosphate) (RDP), and

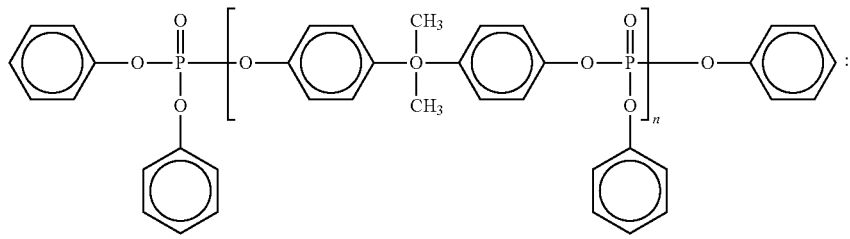

(n = 1-2)

(n=1-2): bis-phenol A bis (diphenyl phosphate)(BDP).

Other examples of phosphorous containing flame retardants are:
- ammonium polyphosphate (APP, such as FR CROS S10 from Budenheim),
- tricresylphosphate (TCP, ex Disflamoll TKP from Lanxess), triphenylphosphate (TPP, ex Disflamoll TP from Lanxess), 2-ethylhexyldiphenylphosphate (Santicizer 141 from Valtris), which are more particularly known as phosphorous plasticizers,
- polyhedral oligomeric silsesquioxane (POSS) enhanced Fire Retardation. Compared to common fire retarded plastics, polymers containing POSS show delayed combustion and major reductions in heat evolution.

Metal phosphinates are preferred.

The fire retardants are preferably selected from inorganic flame retardants, organic flame retardants selected from nitrogen components, phosphorous containing flame retardants, and mixtures thereof, and mixtures of said inorganic and organic flame retardants.

In one preferred embodiment, the composition comprises as organic fire retardants a mixture of a nitrogen component such as melamine cyanurate, and a phosphorous containing flame retardant such as DEPAL.

In this embodiment, the composition can comprise from 5 to 40 parts by weight of a nitrogen component, and from 1 to 30 parts by weight of a phosphorous containing flame retardant, per 100 parts by weight of the polymer blend.

In a more preferred embodiment, the composition further comprises an inorganic flame retardant such as a boron containing compound (zinc borate).

In this embodiment, the composition can comprise from 5 to 40 parts by weight of a nitrogen component, from 1 to 30 parts by weight of a phosphorous containing flame retardant, and from 0.1 to 20 parts by weight of a boron containing compound, per 100 parts by weight of the polymer blend.

In this embodiment, the composition can further comprise another inorganic flame retardant such as a silicate (nanoclay).

In this embodiment, the composition can comprise from 5 to 40 parts by weight of a nitrogen component, from 1 to 30 parts by weight of a phosphorous containing flame retardant, from 0.1 to 20 parts by weight of a boron containing compound, and from 0.1 to 10 parts by weight of a silicate, per 100 parts by weight of the polymer blend.

Preferred compositions of the invention using one or more fire retardants are the following ones:
- a composition further including 8.5 parts by weight of melamine cyanurate, per 100 part by weight of the polymer blend, 8.5 parts by weight of DEPAL, per 100 part by weight of the polymer blend, and 3 parts by weight of zinc borate, per 100 part by weight of the polymer blend;
- a composition further including 8.5 parts by weight of melamine cyanurate, per 100 part by weight of the polymer blend, 8.5 parts by weight of DEPAL, per 100 part by weight of the polymer blend, and 10 parts by weight of zinc borate, per 100 part by weight of the polymer blend; or
- a composition further including 8.5 parts by weight of melamine cyanurate, per 100 part by weight of the polymer blend, 8.5 parts by weight of DEPAL, per 100 part by weight of the polymer blend, 7 parts by weight of zinc borate, per 100 part by weight of the polymer blend, and 3 parts by weight of nanoclay, per 100 part by weight of the polymer blend; or a composition further including 15 parts by weight of melamine cyanurate, per 100 part by weight of the polymer blend, 15 parts by weight of DEPAL, per 100 part by weight of the polymer blend, 4 parts by weight of zinc borate, per 100 part by weight of the polymer blend, and 3 parts by weight of nanoclay, per 100 part by weight of the polymer blend.

In another embodiment, the composition can comprise as inorganic flame retardants, a mixture of at least one silicate (nanoclay) and at least one metal hydroxide such as ATH.

The composition of the invention can further comprise one or more thermal or light stabilizers such as hindered amine light stabilizers (HALS).

The composition can comprise from 0.01 to 5 parts by weight of HALS, per 100 parts by weight of the polymer blend.

As an example, said composition can includes 0.3 parts by weight of HALS, per 100 parts by weight of the polymer blend.

Examples of HALS are tetramethylpiperidine based-HALS such as derivatives of a 2,2,6,6-tetramethylpiperidine (e.g. Tinuvin 622). Such HALS includes N—H type, N—R type, N-OR type, etc.

Preferred compositions of the invention using an hindered amine light stabilizer and one or more fire retardants are the following ones:
  a composition further including 0.3 parts by weight of Hals, per 100 part by weight of the polymer blend, 10 parts by weight of melamine cyanurate, per 100 part by weight of the polymer blend, and 10 parts by weight of DEPAL, per 100 part by weight of the polymer blend; or
  a composition further including 0.3 parts by weight of Hals, per 100 part by weight of the polymer blend, 8.5 parts by weight of melamine cyanurate, per 100 part by weight of the polymer blend, 8.5 parts by weight of DEPAL at 8.5 parts, per 100 part by weight of the polymer blend, and 3 parts by weight of zinc borate, per 100 part by weight of the polymer blend.

The composition can further comprise a compatibilization agent or compatibilizer.

The compatibilization agent can be selected from the group consisting of grafted polymers, in particular of polymers grafted or copolymerized with polar groups such as carboxylic or acid anhydride groups (e.g. maleic anhydride group).

Examples of compatibilization agents are MA-g-PE (polyethylene-grafted maleic anhydride), MA-g-EVA (Ethylene-vinyl acetate-grafted maleic anhydride), or a terpolymer of ethylene, vinyl acetate and carbon monoxide.

In one preferred embodiment the compatibilization agent is a non migrating TPU modifier ethylene/vinyl acetate/carbon monoxide (EVA/CO) copolymer such as Elvaloy 741 (Dupont).

The compositions according to certain embodiments may additionally contain fillers (reinforcing and not), such as: calcium and magnesium carbonates, talcum, chalk, kaolin, carbon black, carbon components, silicates, natural and synthetic fiber, wollastonite, bentonite, huntite, etc. . . .

The compositions according to certain embodiments may additionally contain one or more additives, for example pigments, UV absorbers, processing aids, metal deactivators, lubricants, rheology additives, blowing agents, antistatic agents, antihydrolysis agent etc. . . .

The composition can further comprise an antioxidant, more particularly selected from an amine-based, a phenolic, a phosphite or a thioester antioxidant.

Phenolic antioxidants are preferred such as hindered phenol antioxidants.

In the cable of the invention, the jacket preferably surrounds the one or more conductors.

The jacket is more preferably the outermost layer of the cable.

In one embodiment, some of the conductors are insulated.

In a preferred embodiment, the jacket surrounds one or more (several) insulated conductors.

In one embodiment, the one or more conductors are power conductors, and preferably power insulated conductors.

The cable can further include at least one conductor selected from a ground conductor (or ground wire), a ground-check conductor (or ground check wire), and mixture thereof.

In a preferred embodiment, the cable further includes at least one ground conductor and at least one ground-check conductor.

The cable of the invention can be a mining cable, a heavy industry cable or an automation cable.

The cable of the present invention can further comprise at least one filler.

The cable of the invention is preferably a mining cable, that advantageously passes at least one of the mechanical standards of Insulated Cable Engineers Association (ICEA) ICEA S75-381; the SHA (Mine Safety and Health Administration) fire safety standards of 30 CFR §§ 7.402, 7.406, and 7.408; and the abrasion testing requirements of ISO/NFT® 4649, and more advantageously two or three of them.

The cable of the invention can be automation cable that passes at least one of the VW-1 flame propagation testing and standards according to UL 1581ed4 (08/2013), UL 2556 (03/2013), and/or ASTM D 5207-14; the FT1 flame propagation test according to UL 1581ed4 (08/2013), UL 2556 (03/2013), and/or ASTM D 5207-14; and the Vertical flame propagation on insulated conductor or cable standards according to IEC 60332-1-1 & 1-2 ed 1.0 (2004-07).

A cable according to the present invention can be produced according to a process including the following steps:
  preparing the composition including the polymer blend and optionally one or more additives, and
  extruding the composition onto at least one conductor, and preferably onto at least one insulated conductor.

The composition may be obtained either with a continuous process such as co-rotating twin screw extruder or co-kneader, or with a batch equipment such as an internal mixer with tangential or intermeshing rotors.

For industrial scale, a continuous process maintaining temperature zones below 175° C. is preferred. It can thus avoid degradation of recycled PVB.

A screw speed at 75 rpm may be convenient. The addition of a certain amount of thermal stabilizer may be useful to preserve elastomers from thermal degradation during processing.

It is noted that compared to extrusion of TPU where typically high temperatures are used, extrusion of the composition of the present application care is preferably implemented at a temperature not exceeding 185° C. in the mass during extrusion. This can avoid degradation of the recycled PVB.

BRIEF DESCRIPTION OF THE DRAWINGS

The present invention will become more fully understood through the following examples and accompanying drawings, which are given by way of illustration only, and thus, which are not limits of the present invention.

DETAILED DESCRIPTION

Figure 1:
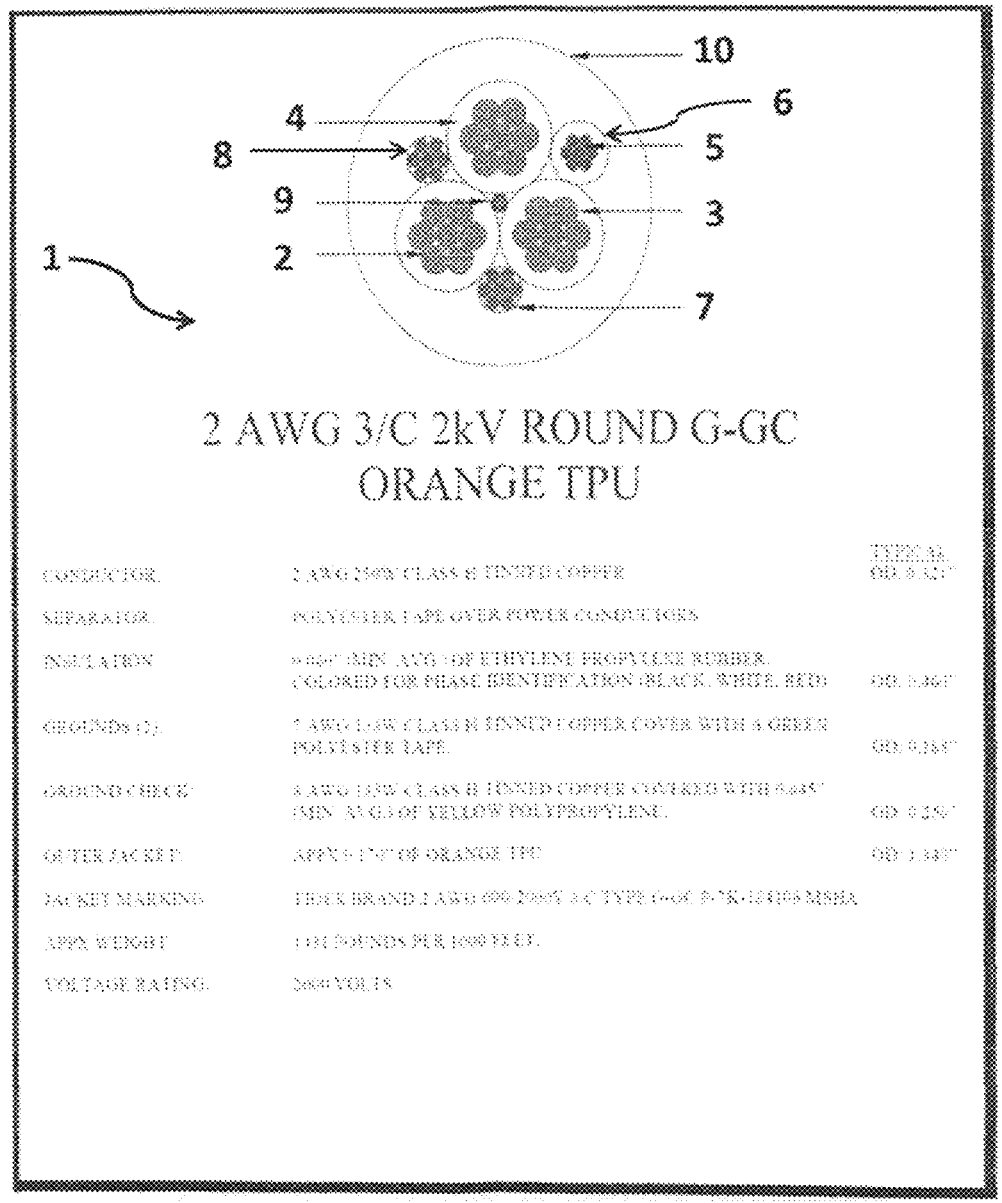
FIG. 1 shows an exemplary mining cable with a jacket according to the prior art.

FIG. 1 shows a 2 AWG 3/C 2 KV round G-GC orange TPU mining cable (1) of the prior art having:
three conductors (2), each including a plurality of metallic wires made of tinned copper, each conductor being surrounded by a separator made of a polyester tape (3), each separator being surrounded by an insulation (4) made of ethylene propylene rubber,
one ground-check conductor (5) including a plurality of metallic wires made of tinned copper, said conductor being surrounded by an insulation (6) made of polypropylene,
two ground conductors (7), each including a plurality of metallic wires made of tinned copper, each conductor being surrounded by a polyester tape (8),
one central filler (9), and
an outer jacket (10) made of TPU.

Figure 2:
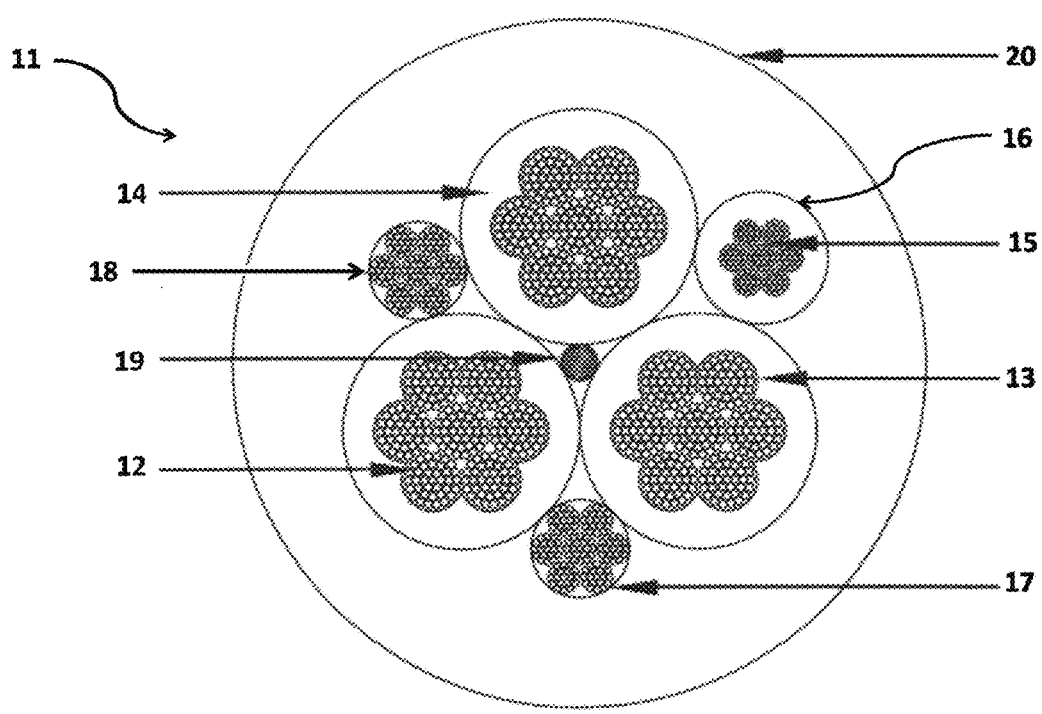
FIG. 2 shows an exemplary mining cable according to one embodiment of the invention.

FIG. 2 shows a mining cable (11) according to the invention having:
three conductors (12), each including a plurality of metallic wires, each conductor being surrounded by a separator made of a polymer tape (13), each separator being surrounded by a polymer insulation (14),
one ground-check conductor (15) including a plurality of metallic wires, said conductor being surrounded by a polymer insulation (16),
two ground conductors (17), each including a plurality of metallic wires, each conductor being surrounded by a polymer tape (18),
one central filler (19), and
an outer jacket (20) made from a composition including a polymer blend of thermoplastic polyurethane (TPU) and Polyvinylbutyral (PVB), with the ratio of PVB to TPU being less than 50% by weight.

In one example insulated conductors (12, 14) are constructed as three separate 2AWG (American Wire Gauge) tinned copper conductors (12) insulated with ethylene propylene rubber (14). Filler (19) is positioned in the center of cable (11) to maintain the spacing of conductors (12, 15, 17). Ground conductors (17) may be constructed of 7AWG tinned copper covered in polyester tape. Ground check-conductor (15) may be constructed with 8AWG tinned copper and insulated with polypropylene (16).

Applicants note that cable (11) is an exemplary construction of the type of cables, such as a mining cable that the present TPU/PVB polymer blend may be applied as a jacket. However, the salient features of the present arrangement, and in particular the polymer blend used for jacket (20), may be used on any applicable cable, heavy industry cable, automation cable or mining cable.

In one embodiment, as discussed in the summary above, jacket (20) may be constructed of a polymer blend based on TPU and PVB and including additional additives as discussed in detail below with respect to the following tables 3 as well, as the additional additives expanded on thereafter.

The following table 3 shows four different formulas for a cable jacket. The left column shows pure TPU (prior art, not part of the invention). TPU1 is TPU/PVB at 75%/25% weight ratio. FR TPU1 according to one embodiment is TPU/PVB at 75%/25% ratio and including fire retardant additives. FR TPU2 according to one embodiment is TPU/PVB at 75%/25% ratio and including fire retardant additives (at a different ratio than FR TPU1). Applicants note that formulas FR TPU1 to FR TPU5 (see the below Table 5 for FR TPU3 to TPU5), are based on phosphorous and nitrogen system. FR TPU6 and FR TPU7 (see the below Table 9 for FR TPU6 and FR TPU7) are based on inorganic flame retardants.

The TPU contained in the following formulas is polyether type TPU. It is noted that, melamine cyanurate is a fire retardant additive. DEPAL (aluminium diethyl-phosphinate) is fire retardant additive, and zinc borate is also a fire retardant additive.

TABLE 3

| | COMPOSITIONS | | | |
| --- | --- | --- | --- | --- |
| Reference | Comp.A (8) | TPU1 | FR TPU1 | FR TPU2 |
| TPU ether (1) | | 75 | 75 | 75 |
| PVB (2) | | 25 | 25 | 25 |
| DEPAL (3) | | — | 8.5 | 8.5 |
| MC (4) | | — | 8.5 | 8.5 |
| Zinc borate (5) | | — | 3 | 10 |
| ATH (6) | | — | — | — |
| Nanoclay (7) | | — | — | — |
| TOTAL (phr) | 100 | 100 | 120 | 127 |

In the present specification, compositions are described with per hundred rubber (phr), the rubber being the polymer blend of TPU and PVB.

The following is at least one commercial version of the above listed components from Table 3:

(1) Elastollan 1185 A 10: polyether-TPU with hardness 85 ShA from BASF GmbH, density=1.12;

(2) PVB B0: post consumer PVB from Hainault Plast coming from interlayer in laminated glass, obtained after specific purification treatment involving low impurities content, Melt Index (190° C., 2.16 kg)=1.8±0.1 g/10 min, density=1.08; PVB B0 contains approximately from 30 to 40 parts by weight of plasticizer, with respect to 100 parts of PVB.

(3) MELAPUR MC 25: melamine cyanurate from BASF GmbH, density=1.7, average particle size D50=25 microns. It is a salt comprised of melamine and cyanuric acid held together by an extensive two-dimensional network of hydrogen bonds;

(4) Exolit OP 1230: aluminium diethyl phosphinate (also called DEPAL) from Clariant, phosphorous content P=23.3-24 wt %, average particle size D50=20-40 microns, density=1.35;

(5) Firebake ZB: zinc borate from Borax. It is a boron flame retardant used as smoke and afterglow suppressant and anti-arcing agent in polymer. Chemical and theorical composition are respectively $2ZnO.3B_2O_3.3.5H_2O$ and $48.05\%/37.45\%/14.5\%$ of $B_2O_3/ZnO/H_2O$ The average particle size is 9 microns measured by laser diffraction;

(6) APYRAL 40: aluminium trihydrate Al(OH)3 from Nabaltec. 99.5% of purity. Average particle size is D50=1.3 microns; specific surface area=3.5 $m^2/g$; density=2.4;

(7) Cloisite SE 3000: this nanoclay is a layered magnesium aluminium silicate platelets which are organically surface modified to permit complete dispersion in polymer matrix. Its thickness is 10 to 50 times smaller (ca. 1 mm) than conventional layered fillers such as kaolin with an exceptionally high aspect ratio of more than 100, allowing high improvement of the properties even at very low concentration of nanoclay, and (8) Pure TPU Elastollan 1185 FHF.

It is noted that in addition to the three exemplary polymer formulas TPU, FR TPU 1 and FR TPU 2 set forth above, it is contemplated that certain variations may be included such as: a variation of the ratio of TPU/PVB (variations above and below 75%/25% provided that the amount of PVB remains below 50%; and a change in the amounts or types of combined fire retardant ingredients.

Once the formulation is set, the polymer blend is compounded to prepare for extrusion as a jacket onto cable (20). Before mixing, TPU is dried in an oven during 2 hours at 90° C. The laboratory samples from this application are made with an internal mixer 300 cc with mixing parameters described below.

Mixing parameters with an internal mixer 300 cc—are the following ones:

Heating of the mixer to 130° C.;
Incorporation of TPU polymer and mixing at 80 rpm until 160° C.;
Incorporation of PVB, flame retardants and other ingredients at 40 rpm; and
Unloading between 180 and 185° C. and homogenizing on external mixer at 150° C.

The compounds are put into 5 mm-slab shape after calendering in roll mill.

The following Table 4 shows the various testing results of TPU1, FR TPU1 and FR TPU2 when undergoing the mechanical testing required for ICEA S-75-381, the abrasion testing results under ISO/NFT® 4649 (Method B rolling sample), and finally the fire test results under 30 CFR §§ 7.406 and 7.408. The trials were done on sheathed copper wire 1.5 mm² and material thickness ca. 1.2 mm.

TABLE 4

| | CHARACTERISTICS | | | |
|---|---|---|---|---|
| Property | Comp.A | TPU1 | FR TPU1 | FR TPU2 |
| Density | 1.12 | 1.113 | 1.15 | 1.14 |
| TS (psi/MPa) | 6526/45 | 6367/43.9 | 4495/31 | 5325/36.7 |
| EB (%) | 600 | 463 | 428 | 388 |
| Tear strength (ppi/N · mm) | | 154/27.2 | 150/26.3 | 105/18.3 |
| Abrasion loss(mm3) NFT4649-method B | 55 | 66 | 105 | 110 |
| Fire test (lab trials) type FT2 | Pass (lot of burning drops) | failed | Pass with a few burning drops | Pass without burning drops |

TS = tensile strength/EB = elongation at break

From the results it is shown that TPU1 TPU/PVB 75/25 was acceptable on the mechanical testing the flame test requirements under 30 CFR § 7.408. This is because PVB is relatively durable mechanically, and is a good match with TPU for mining cables.

Formulas FR TPU1 and FR TPU2, in addition to have acceptable mechanical properties, did pass the flame test requirements under 30 CFR § 7.408, and in fact exceed pure fire resistant commercial TPU (Comp.A), because of the addition of efficient fire retardant additives. In fact, FR TPU2 far outperformed standard grade TPU, experiencing no burning drops during flame test. In particular, DEPAL has synergistic properties with melamine cyanurate in the composition of the present invention.

The tests above were performed on the exemplary embodiment of the TPU/PVB formulation in the context of certain tests for the mining industry. However as noted above, the present TPU/PVB formulation can be used on other cables such as those in industry automation. The following is another exemplary embodiment of the TPU/PVB formulation in the context of industry automation requirements.

In the present arrangement, as explained below, additional TPU/PVB blends were prepared for test abrasion loss, tensile strength and flexibility against comparison pure TPU Elastollan 1185 FHF and 1190FHF from BASF (named Comp.A above mentioned and Comp.B below mentioned).

In order to compare fire performance of formulas a cone calorimeter was used on the Comp.A and Comp.B formulas as well as TPU1, FR TPU1, FR TPU2, FR TPU3, and FR TPU4.

Test conditions cone calorimeter (ISO 5560 part 1&2)

| | MEASUREMENT | Prescription |
|---|---|---|
| Heat Flux (Kw/m²) | 50 | 50 |
| Plate dimension | 100 × 100 × 3 | 100 × 100 × 3 |
| Horizontal or vertical plate | horizontal | |
| Spacing specimen/cone (mm) | 25 | 25 |
| With or without grid | with | |
| Air flow in exhaust tube (l/s) | 24 | 24 |

(The plates are preheated during 3 min at 180° C., then molded at 180° C./200 bars during 5 min and then cooled 5 min until 80° C.)

A Petrella plot is used to represent cone calorimeter results. (Ref: The Assessment of Full-Scale Fire Hazards from Cone calorimeter Data, R. V. Petrella, *Journal of Fire Sciences* 1994; 12; 14).

Fire-retarded materials should present a low fire load (i.e. total heat release, THR), have a long time to ignition ($t_{ign}$), a low peak heat release rate (PHRR), and so a low fire growth index (PHRR/$t_{ign}$).

PHRR/$t_{ign}$ is the ratio of peak of heat release rate to time to ignition. It represents the measure of contribution that the material concerned makes to a rapidly growing fire. THR is the measure of contribution that the material concerned makes to a fire of long duration.

A Petrella plot (THR vs PHRR/$t_{ign}$) is a schematic representation of fire retarded materials to compare them easily. The lower the fire growth index and THR, the better the material is. In this plot system, higher values of PHHR/$t_{ign}$ are associated with a greater propensity to flashover.

One parameter a cone calorimeter analysis is the number called FIGRA which is the ratio between peak of heat release and time necessary to obtain this peak (KW/s). This ratio is defined as the fire growth rate index and must be the lowest possible.

With applicant equipment, required values to be similar in properties to commercially available flame retardant TPUs named hereafter Comp.A and Comp.B:

Minimum technical requirements THR<86 and PHHR/$t_{ignition}$<29
Preferred technical values THR≤82 and PHHR/$t_{ignition}$≤22

The Comp.A and Comp.B formulas as well as TPU1, FR TPU2, FR TPU3, FR TPU4, and FR TPU5 formulas are set forth in the following table 5.

TABLE 5

| | | | COMPOSITIONS | | | | |
|---|---|---|---|---|---|---|---|
| Reference | Comp.A | Comp.B | TPU1 | FR TPU2 | FR TPU3 | FR TPU4 | FR TPU5 |
| TPU éther | | | 75 | 75 | 75 | 75 | 75 |
| PVB | | | 25 | 25 | 25 | 25 | 25 |
| DEPAL | | | — | 8.5 | 8.5 | 8.5 | 15 |
| MC | | | — | 8.5 | 8.5 | 8.5 | 15 |
| zinc borate | | | — | 3 | 10 | 7 | 4 |
| ATH | | | — | — | — | — | — |
| nanoclay | | | — | — | — | 3 | 3 |
| TOTAL (phr) | 100 | 100 | 100 | 120 | 127 | 127 | 137 |

The following table 6 shows the results of the cone calorimeter tests on the above formulas.

TABLE 6

| | | | RESULTS | | | | |
|---|---|---|---|---|---|---|---|
| Reference | Comp.A | Comp.B | TPU1 | FR TPU2 | FR TPU3 | FR TPU4 | FR TPU5 |
| PHRR (kW/m$^2$) | 760 | 622 | 1250 | 716 | 488 | 462 | 446 |
| tti (s) | 30 | 26 | 18 | 18 | 20 | 21 | 24 |
| THR (kW/m$^2$) | 82 | 79 | 100 | 93 | 81 | 77 | 74 |
| PHRR/tti (kW·m$^{-2}$·s$^{-1}$) | 25.3 | 23.9 | 68 | 39.8 | 24.4 | 22.5 | 18.6 |
| FIGRA (kW·m−2·s−1) | 7.1 | 6.2 | 11.4 | 5.1 | 6.2 | 3.2 | 2.6 |

Figure 3:
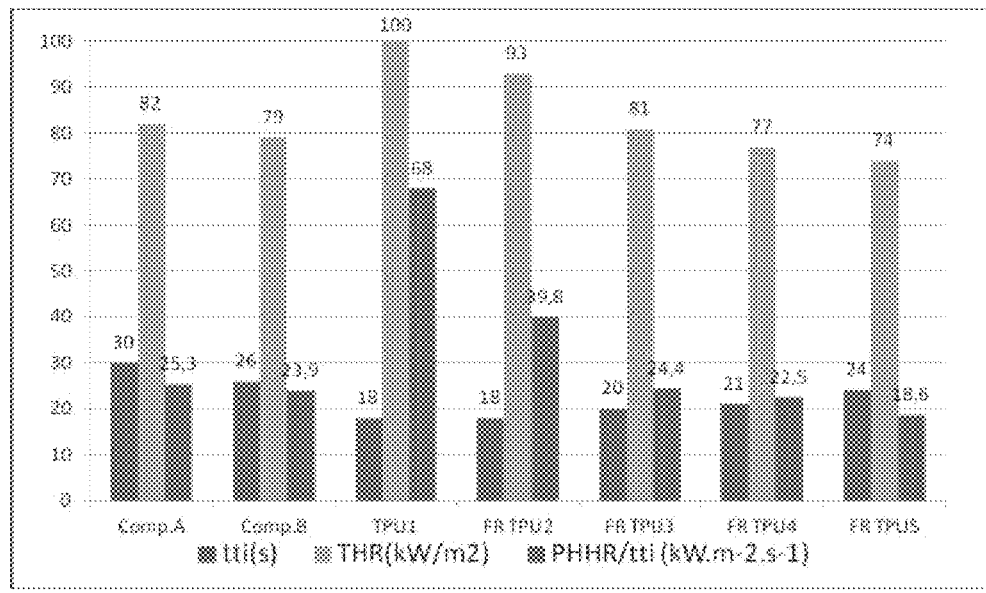
FIGS. 3 and 4 show the comparison of calorimeter results and a Petrella plot for Comp.A, Comp.B compositions as well as for TPU1, FR TPU2, FR TPU3, FR TPU4, and FR TPU5 compositions.
Figure 4:
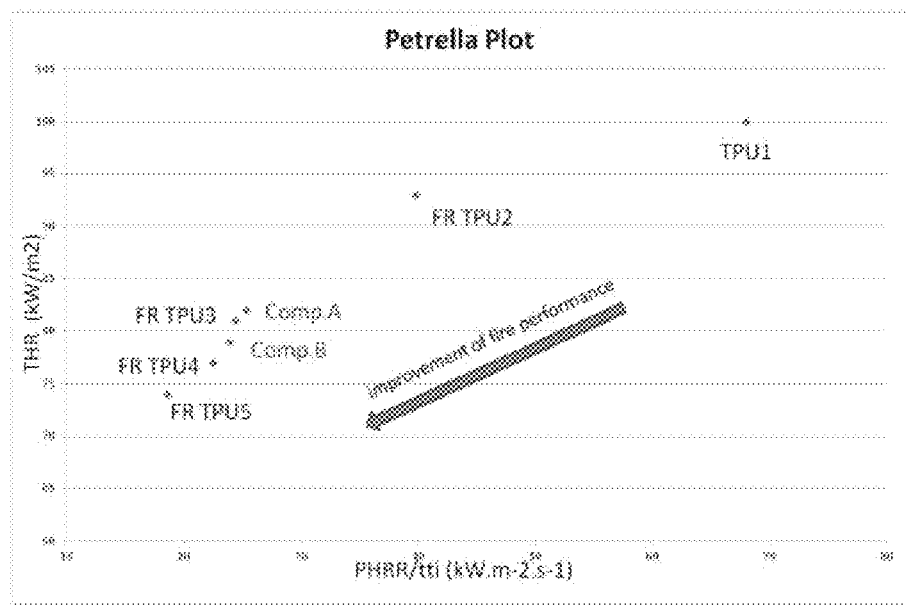

FIGS. 3 and 4 show the comparison of calorimeter results and a Petrella plot for Comp.A, Comp.B compositions as well as for TPU1, FR TPU2, FR TPU3, FR TPU4, and FR TPU5 compositions.

The following tables 7-10 illustrate formulations (table 7), and the test results of the cone calorimeter tests (table 8) for formula FR TPU6 and FR TPU7, which are based on inorganic flame retardants.

Figure 5:
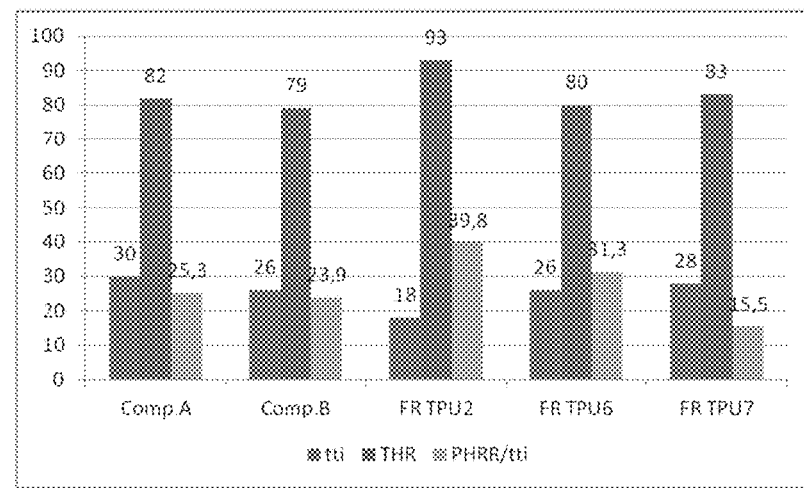
FIGS. 5 and 6 show the comparison of calorimeter results and a Petrella plot for Comp.A, Comp.B compositions as well as for FR TPU2, FR TPU6, and FR TPU7 compositions.
Figure 6:
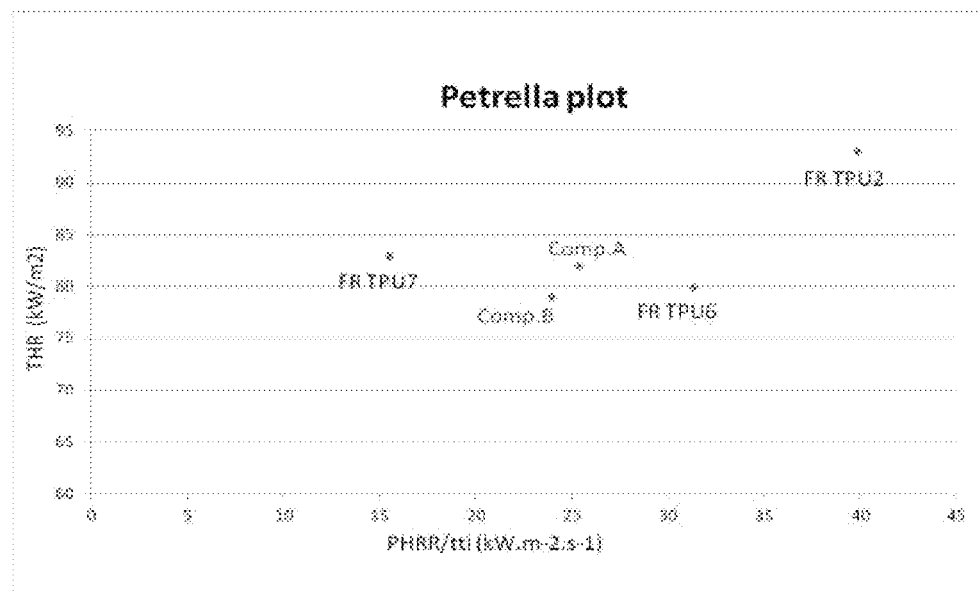

In addition, FIGS. 5 and 6 show the comparison of calorimeter results and a Petrella plot for Comp.A, Comp.B compositions as well as for FR TPU2, FR TPU6, and FR TPU7 compositions.

TABLE 7

| | | | COMPOSITIONS | | |
|---|---|---|---|---|---|
| Reference | Comp.A | Comp.B | FR TPU2 | FR TPU6 | FR TPU7 |
| TPU ether (1) | | | 75 | 75 | 75 |
| PVB (2) | | | 25 | 25 | 25 |
| DEPAL (3) | | | 8.5 | — | — |
| MC (4) | | | 8.5 | — | — |
| Zinc borate (5) | | | 3 | — | — |
| ATH (6) | | | — | 28 | 23 |
| Nanoclay (7) | | | — | — | 5 |
| TOTAL (phr) | 100 | 100 | 120 | 128 | 128 |

TABLE 8

| | | | RESULTS | | |
|---|---|---|---|---|---|
| Reference | Comp.A | Comp.B | FR TPU2 | FR TPU6 | FR TPU7 |
| PHRR (kW/m$^2$) | 760 | 622 | 716 | 814 | 427 |
| tti (s) | 30 | 26 | 18 | 26 | 28 |
| THR (kW/m$^2$) | 82 | 79 | 93 | 80 | 83 |
| PHRR/tti (kW·m$^{-2}$·s$^{-1}$) | 25.3 | 23.9 | 39.8 | 31.3 | 15.5 |
| FIGRA (kW·m−2·s−1) | 7.1 | 6.2 | 5.1 | 5.5 | 2.9 |

The advantage of formulas FR TPU6 and FR TPU7 is the low smoke release compared with for example formula FR TPU2. The addition of nanoclay in formula allows a reduction of 47% of PHRR value and a slight increase of time to ignition.

The invention claimed is:

1. A cable comprising:
   one or more conductors; and
   a jacket,
   wherein said jacket is made from a composition including a polymer blend of thermoplastic polyurethane (TPU), and Polyvinylbutyral (PVB), with the ratio of PVB to TPU being less than 50% PVB by weight of the total weight of the polymer blend, the remainder of the polymer blend being TPU.

2. The cable as claimed in claim 1, wherein said the ratio of PVB to TPU being substantially 25% PVB to 75% TPU by weight over the total weight of the polymer blend.

3. The cable as claimed in claim 1, wherein the TPU of the polymer blend is selected from a thermoplastic polyether polyurethane and a thermoplastic polyester polyurethane.

4. The cable as claimed in claim 1, wherein said composition further comprises one or more fire retardants.

5. The cable as claimed in claim 1, wherein said composition further comprises from 5 to 60 parts by weight of fire retardants, per 100 parts by weight of the polymer blend.

6. The cable as claimed in claim 4, wherein said fire retardants are selected from the group consisting of inorganic flame retardants, organic flame retardants and mixture of organic and inorganic flame retardants.

7. The cable as claimed in claim 6, wherein the organic flame retardants are selected from nitrogen components, halogenated flame retardants, phenol formaldehyde resins, phosphorous containing flame retardants, and mixtures thereof.

8. The cable as claimed in claim 6, wherein the composition comprises as organic fire retardants a mixture of a nitrogen component and a phosphorous containing flame retardant; or as inorganic flame retardants a mixture of at least one silicate and at least one metal hydroxide.

9. The cable as claimed in claim 1, wherein said PVB is recycled.

10. The cable as claimed in claim 1, wherein said composition further comprises a PVB plasticizer.

11. The cable as claimed in claim 10, wherein the PVB plasticizer is selected from the group consisting of aliphatic esters, aromatic esters, fatty esters, phosphate esters, sulfonamides, phthalates, and mixtures thereof.

12. The cable as claimed in claim 1, wherein said composition further comprises a compatibilization agent selected from the group consisting of polymers grafted or copolymerized with polar groups.

13. The cable as claimed in claim 1, wherein said PVB is a random ter-polymer of vinyl butyral, vinyl alcohol and vinyl acetate as co-monomers.

14. The cable as claimed in claim 1, wherein said cable is a mining cable that passes at least one of the mechanical standards of Insulated Cable Engineers Association (ICEA) ICEA S75-381; the abrasion testing requirements of ISO/NFT® 4649; the SHA (Mine Safety and Health Administration) fire safety standards of 30 CFR §§ 7.402, 7.406, and 7.408.

15. The cable as claimed in claim 1, wherein said cable is an automation cable that passes at least one of the VW-1 flame propagation testing and standards according to UL 1581ed4 (08/2013), UL 2556 (03/2013), and/or ASTM D 5207-14; the FT1 flame propagation test according to UL 1581ed4 (08/2013) and UL 2556 (03/2013) and/or ASTM D 5207-14; and the Vertical flame propagation on insulated conductor or cable standards according to IEC 60332-1-1 & 1-2 ed 1.0 (2004-07)).

16. The cable as claimed in claim 1, wherein said jacket surrounds one or several insulated conductors.

17. The cable as claimed in claim 8, wherein the composition comprises as organic fire retardants a mixture of a nitrogen component, a phosphorous containing flame retardant, and as inorganic fire retardant a boron containing compound.

* * * * *